C. L. MICHOD.
ART OF STORING VEHICLES.
APPLICATION FILED MAR. 3, 1920.

1,347,960.

Patented July 27, 1920.
2 SHEETS—SHEET 1.

Witness:
Harry S. Gaither

Inventor:
Charles L. Michod

C. L. MICHOD.
ART OF STORING VEHICLES.
APPLICATION FILED MAR. 3, 1920.
1,347,960.
Patented July 27, 1920.
2 SHEETS—SHEET 2.
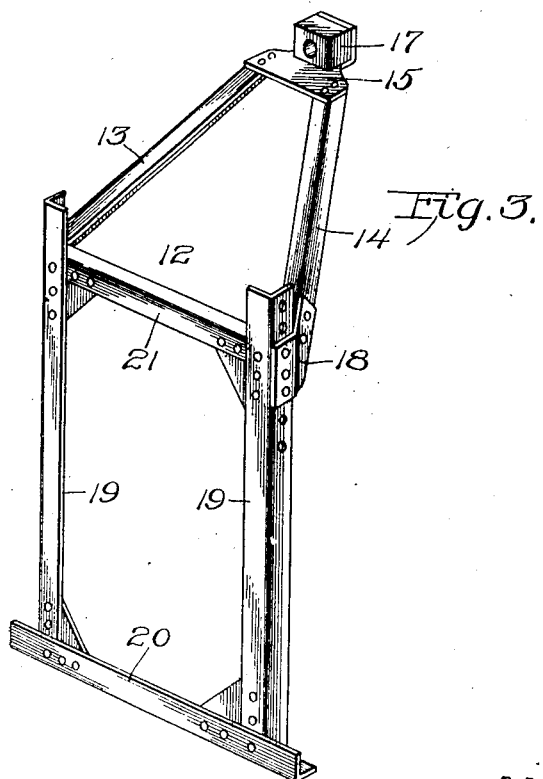
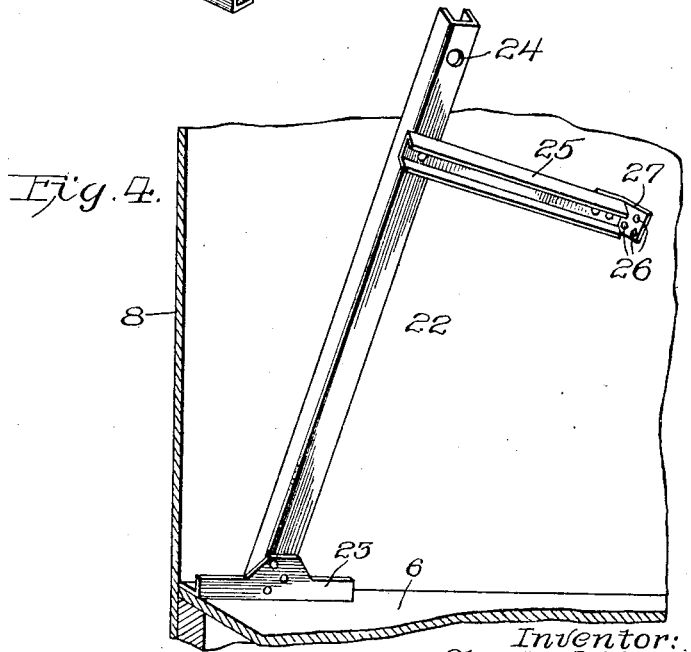
Witness:
Harry S. Gauther
Inventor:
Charles L. Michod
Dyrenforth, Lee, Chritton & Wiles
Attys.

UNITED STATES PATENT OFFICE.

CHARLES L. MICHOD, OF MORGAN PARK, ILLINOIS.

ART OF STORING VEHICLES.

1,347,960.   Specification of Letters Patent.   Patented July 27, 1920.

Application filed March 3, 1920. Serial No. 363,061.

*To all whom it may concern:*

Be it known that I, CHARLES L. MICHOD, a citizen of the United States, residing at 2600 W. 111th street, Morgan Park, in the county of Cook and State of Illinois, have invented a new and useful Improvement in the Art of Storing Vehicles, of which the following is a specification.

My invention relates, more particularly, to the storing of automobiles in cars, such as freight cars, for the shipping of the same; and my object generally stated, is to provide novel, simple and economical means for properly supporting vehicles in elevated position, as in cars, to thereby permit of the supporting of the vehicles in tiers or in overlapped relation, and economize in the use of space within the cars, or other storage space.

Figure 1:
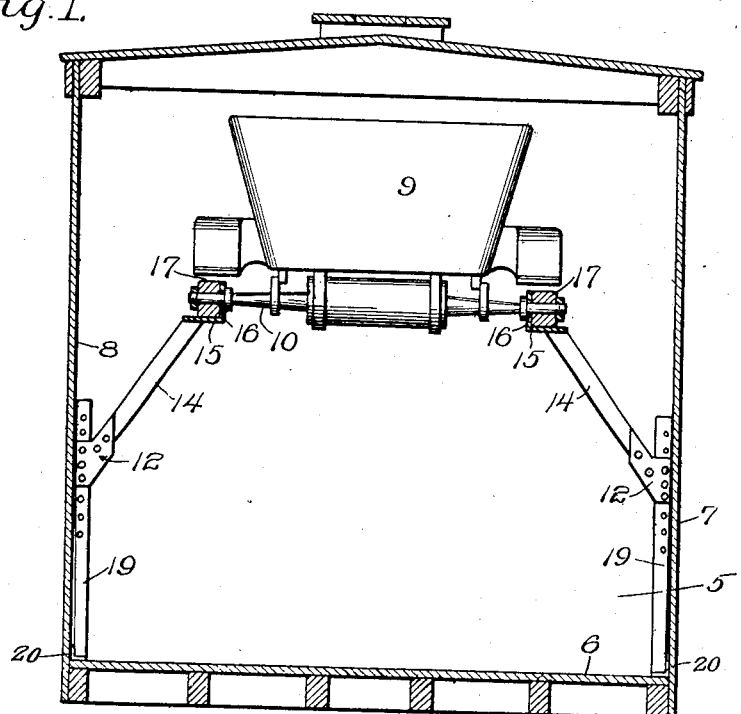
Figure 2:
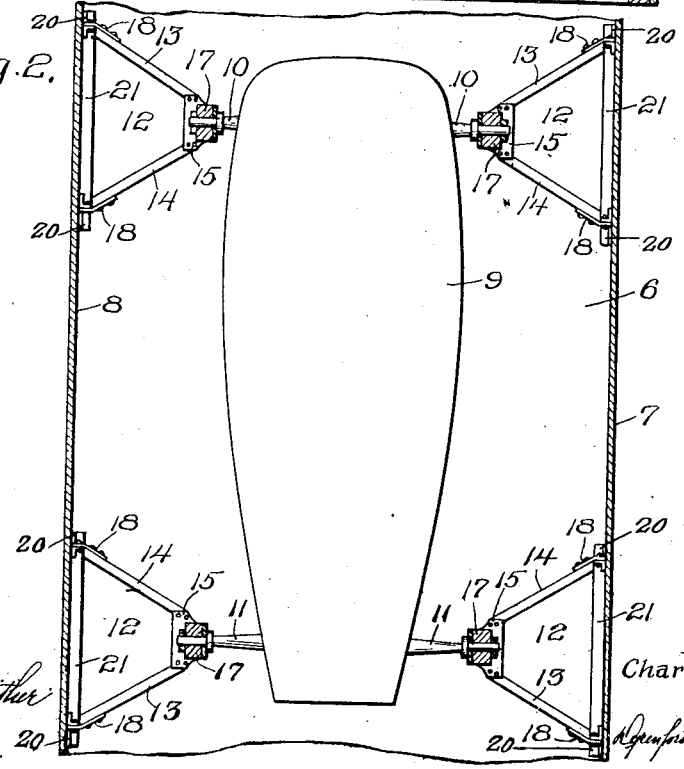

Referring to the accompanying drawings:—Figure 1 is a cross-sectional view of a freight car showing an automobile supported therein in elevated position in accordance with one of the embodiments of my invention. Fig. 2 is a plan sectional view of the same showing the automobile diagrammatically. Fig. 3 is a perspective view of one of the similar supporting racks employed in the structure shown in Fig. 1; and Fig. 4, a similar view of a modification of the supporting rack showing it in the position it occupies relative to a side and the floor of the car.

Referring more particularly to the structure shown in Figs. 1, 2 and 3, a freight car in connection with which I have chosen to illustrate my invention is illustrated at 5, its floor being shown at 6 and its opposite sides at 7 and 8. In the arrangement shown in these figures the automobile, which is represented at 9, is supported in elevated position at four corners, as distinguished from supported to extend in raised position at one end only, but which disposition of the automobile is within my invention, the supporting of the automobile being effected from the ends of the axles 10 and 11 from which the wheels, preferably, have been removed.

The supporting of the automobile, as shown, is accomplished by the provision of supporting racks 12, one at each of the four axle ends, these racks, in the particular embodiment of the invention now being described, being each formed of an outwardly and downwardly inclined brace member 13 and a downwardly and outwardly inclined brace member 14, the members 13 of the racks at one end of the automobile also inclining in a rearward direction as shown of the racks at the upper end of Fig. 2, and the members 13 of the racks at the opposite end of the automobile also inclining in a forward direction as shown at the lower end of Fig. 2, the brace members 13 thus not only inclining laterally but also in a direction lengthwise of the car. The members 14 in addition to inclining as stated incline toward each other from opposite ends of the automobile as shown. The members 13 and 14 which may be of any suitable form and shape are preferably formed of angle iron, the members of each rack being united at their converging ends as by an angle-plate 15 containing an aperture 16 for receiving the end of the axle which also, by preference, extends through an apertured block 17 mounted on the plate 15. The members 13 and 14 connect at their lower ends, at which they are provided with plates 18, with the uprights 19 which are connected at their lower ends with, and rise from, a cross-piece 20 which is adapted to rest upon the floor 6 of the car and against the adjacent wall of the car, the uprights being connected together at their upper ends by the cross-member 21, the parts described thereby forming a rigid frame-like structure.

In the use of the racks described, the automobile to be supported is elevated in the car to the desired position and four of the supporting racks described applied to the position as shown in Figs. 1 and 2 and with the ends of the axles positioned on the tops of the frames as shown, and the racks then nailed, or otherwise fastened, to the floor and side of the car for securing them against displacement, in a manner not shown.

The supporting means shown in Fig. 4 is formed of a member 22 shown as, and by preference, an angle iron bar which corresponds with the member 13, but instead of extending toward the automobile, from the wall of the car at a point above the floor, bears at a shoe portion 23 on the member 22 preferably at the juncture of the floor and wall of the car, the shoe portion 23 being held against displacement by being nailed, or otherwise secured to the car in a manner not shown, the upper ends of the bars 22 having apertures 24 for receiving the ends of the axles of the automobile to be supported. The supporting means also involves a member 25 which is preferably connected with the member 22 between the ends of the latter, the members 25 of the several supporting means corresponding with the members 14 of the rack of Figs. 1, 2 and 3, and preferably inclining generally as stated of the latter, with their outer ends secured to the adjacent side walls of the car, as by nails represented at 26 driven into these side walls through openings in foot-plates 27 secured to the outer ends of the members 25, the latter engaging the side walls of the car at points above the floor. If desired the members 25 instead of connecting directly with the members 22 may engage the axle, or other part of the automobile.

It will be noted from the foregoing that in each of the supporting means shown the innermost members (the members 14 in the one construction and the members 25 in the other) operate against the side of the car above the floor and serve by such positioning as very effective means, in conjunction with the other, inclined, members of the supporting means for bracing the automobile against displacement in the car.

While I have illustrated and described two constructions embodying my invention, I do not wish to be understood as intending to limit it thereto as the same may be otherwise variously modified and altered without departing from the spirit of my invention.

What I claim as new and desire to secure by Letters Patent is:

1. The combination with a freight-car, of a vehicle therein, and a supporting structure for the vehicle formed of a brace member operatively engaging said vehicle and inclining downwardly and laterally therefrom and in a direction lengthwise of the vehicle, said brace member being held at its lower end, by the car, against displacement, and a second brace member adjacent said first-referred-to brace member and operatively engaging the vehicle and inclining downwardly and laterally therefrom and in a direction lengthwise of the vehicle opposite that in which said first-referred-to brace member extends, the outer end of said second brace member engaging the adjacent wall of the car at a point above the car-floor.

2. The combination with a freight-car, of a vehicle therein, and a supporting structure for the vehicle formed of a brace member operatively engaging said vehicle and inclining downwardly and laterally therefrom and in a direction lengthwise away from the vehicle, said brace member being held at its lower end, by the car, against displacement, and a second brace member adjacent said first-referred-to brace member and operatively engaging the vehicle and inclining downwardly and laterally therefrom and in a direction lengthwise of the vehicle opposite that in which said first-referred-to brace member extends, the outer end of said second brace member engaging the adjacent wall of the car at a point above the car-floor.

3. The combination with a freight-car, of a vehicle therein, and a supporting structure for the vehicle formed of a brace member operatively engaging said vehicle and inclining downwardly and laterally therefrom and in a direction lengthwise of the vehicle, said brace member operatively engaging at its outer end the adjacent wall of the car above the car-floor, and a second brace member adjacent said first-referred-to brace member and operatively engaging said vehicle and inclining downwardly and laterally therefrom and in a direction lengthwise of the vehicle opposite that in which said first-referred-to brace member extends, the outer end of said second brace member engaging the adjacent wall of the car at a point above the car-floor.

4. The combination with a freight-car, of a vehicle therein, and a supporting structure for the vehicle formed of a brace member operatively engaging said vehicle and inclining downwardly and laterally therefrom and in a direction lengthwise of the vehicle, a second brace member adjacent said first-referred-to brace member and operatively engaging said vehicle and inclining downwardly and laterally away from the vehicle, and in a direction lengthwise of the vehicle opposite that in which said first-referred-to brace member extends, and a frame supported in the car adjacent a wall of the latter and with which the outer ends of said brace members operatively engage at points above the car-floor.

5. The combination with a freight-car, of a vehicle therein, and a plurality of supporting structures for the vehicle located at the corners of the vehicle, each of said supporting structures being formed of a brace member operatively engaging said vehicle and inclining downwardly and laterally therefrom and held at its lower end, by the car, against displacement, and a second brace member adjacent said first-referred-to brace member and operatively engaging the vehicle and inclining downwardly and laterally therefrom, with its outer end engaging the adjacent wall of the car at a point above the car-floor, said brace members inclining in directions lengthwise of the vehicle.

6. The combination with a freight-car, of a vehicle therein, and a plurality of supporting structures for the vehicle located at the corners of the vehicle, each of said supporting structures being formed of a brace member operatively engaging said vehicle and inclining downwardly and laterally therefrom and held at its lower end, by the car, against displacement, and a second brace member adjacent said first-referred-to brace member and operatively engaging the vehicle and inclining downwardly and laterally therefrom, with its outer end engaging the adjacent wall of the car at a point above the car-floor, said first-referred-to brace members inclining in directions lengthwise and away from the vehicle and each of said second brace members inclining in a direction lengthwise of the vehicle but in the direction opposite to that in which the one of said first-referred-to brace members with which it coöperates extends.

7. The combination with a freight-car, of a vehicle therein, and a plurality of supporting structures for the vehicle located at the corners at one end of the vehicle, each of said supporting structures being formed of a brace member operatively engaging said vehicle and inclining downwardly and laterally therefrom and held at its lower end, by the car, against displacement, and a second brace member adjacent said first-referred-to brace member and operatively engaging the vehicle and inclining downwardly and laterally therefrom, with its outer end engaging the adjacent wall of the car at a point above the car-floor, said brace members inclining in a direction lengthwise of the vehicle.

CHARLES L. MICHOD.